Dec. 21, 1965  A. RIVERA  3,224,635
AUTOMATIC MEASURING AND DISPENSING DEVICE
Filed Nov. 5, 1964  3 Sheets-Sheet 3

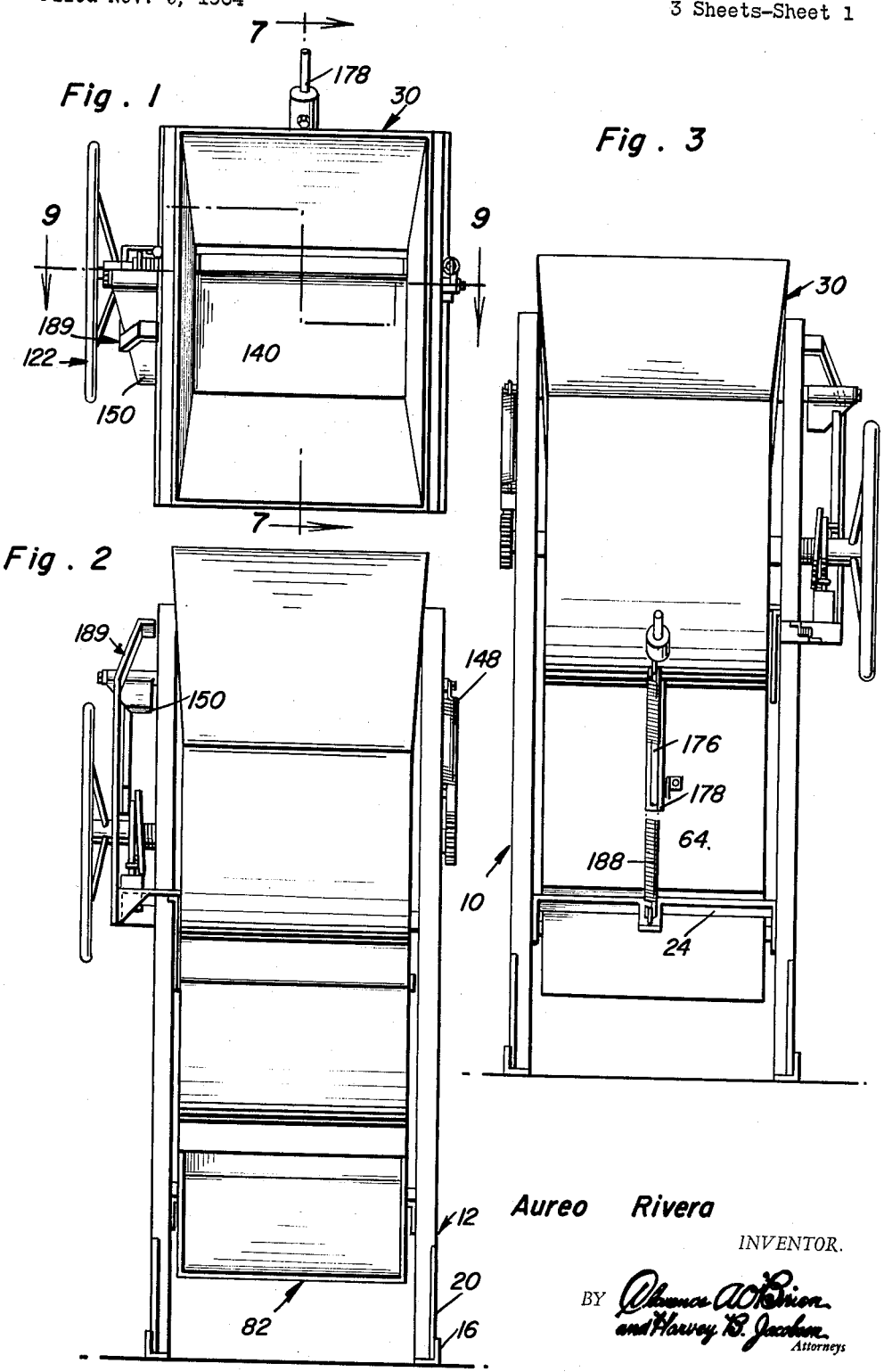

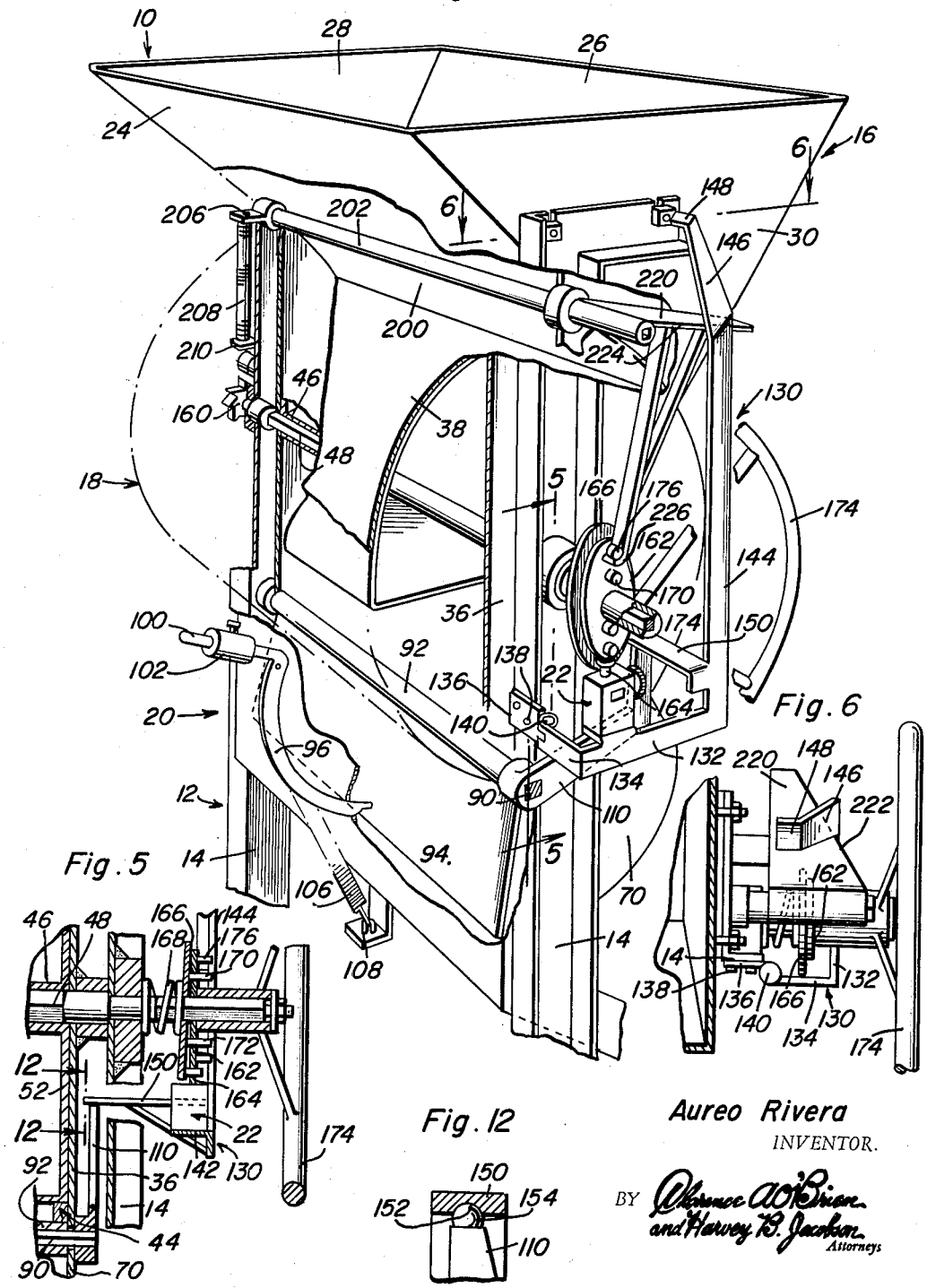

Aureo Rivera
INVENTOR.

BY *Clarence A. O'Brien*
*and Harvey B. Jackson*
Attorneys

United States Patent Office 3,224,635
Patented Dec. 21, 1965

3,224,635
AUTOMATIC MEASURING AND DISPENSING
DEVICE
Aureo Rivera, P.O. Box 608, Morovis, Puerto Rico
Filed Nov. 5, 1964, Ser. No. 410,349
13 Claims. (Cl. 222—36)

This invention relates to an automatic measuring and dispensing device and more particularly to devices for automatically and continuously measuring and dispensing a predetermined volume of granular or flowable material such as coffee cherries. This application is a continuation-in-part of my prior copending application, Serial No. 192,502, filed May 4, 1962, and bearing the same title, and now abandoned.

It is a primary object of the invention to provide a device having a hopper for holding a large quantity of flowable material and which will automatically and continuously measure and dispense in succession a plurality of equal units by volume and/or weight of the material until only a fraction of a unit of the material remains in the hopper.

It is another object of the invention to provide a device as described above which will automatically weigh and dispense the fractional unit remaining in the hopper after it becomes substantially empty.

It is another object of the invention to provide a device which will not only measure and dispense a plurality of units by volume of flowable material, but will automatically count the units measured and dispensed.

It is still another object of the invention to provide a measuring and dispensing device which has removable cover portions so as to permit the inside of the device to be cleaned or repaired when necessary.

Yet another object of the invention is to provide an automatic measuring and dispensing device which is more efficient and reliable in operation than previous devices.

These together with other objects and advantages which will become subsequently apparent reside in the details of construction and operation as more fully hereinafter described and claimed, reference being had to the accompanying drawings forming a part hereof, wherein like numerals refer to like parts throughout, and in which:

FIGURE 1 is a top plan view of a preferred form of the invention;

FIGURE 2 is a front elevational view thereof;

FIGURE 3 is a rear elevational view;

FIGURE 4 is a fragmentary perspective view of the upper portion of the apparatus, parts being broken away and shown in section and the association of certain parts of the apparatus being shown in phantom therein;

FIGURE 5 is a detail view taken in vertical section upon an enlarged scale substantially upon the plane indicated by the section line 5—5 of FIGURE 4;

FIGURE 6 is a further detail view taken upon an enlarged scale in horizontal section substantially upon the plane indicated by the section line 6—6 of FIGURE 4;

FIGURE 12 is a detail view taken in vertical section upon an enlarged scale substantially upon the plane indicated by the section line 12—12 of FIGURE 5 and showing a ball detent latch means of the invention.

*General construction of the apparatus*

Figure 7:
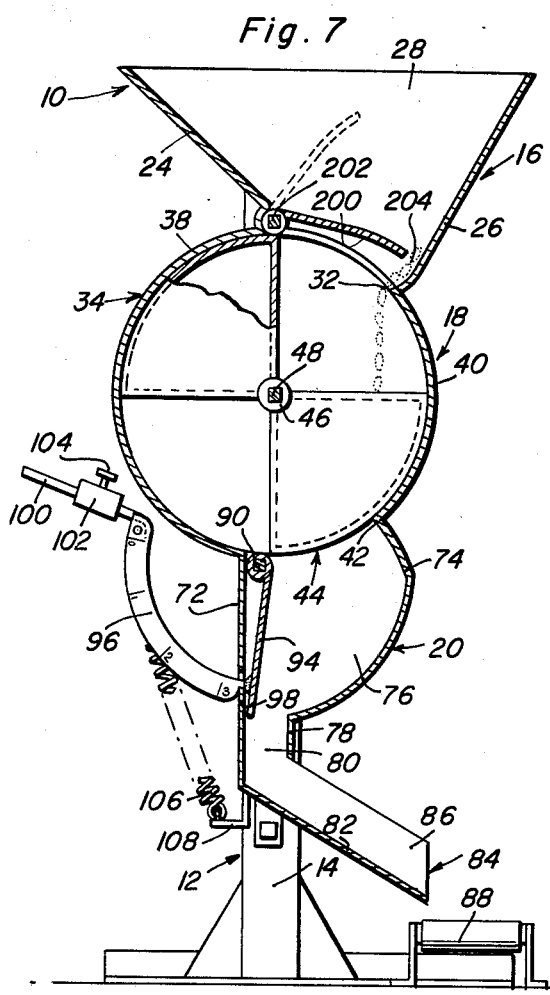
FIGURE 7 is a vertical sectional view through the apparatus taken upon an enlarged scale substantially upon the plane indicated by the section line 7—7 of FIGURE 1.

The preferred apparatus in accordance with this invention comprises a device specifically adapted for automatically measuring, dispensing and counting discrete batches or quantities of a granular commodity such as coffee beans or cherries in uniform volumes. The device indicated generally by the numeral 10 includes a vertically extending supporting frame 12 of any suitable construction which in itself forms no part of the invention set forth and claimed hereinafter and therefore requires no further description.

However, the frame includes a pair of U-shaped vertical channel members 14 constituting standards or studs, upon and between which are mounted the main components of the apparatus. These consist of a supply hopper 16 at the uppermost part of the standards, a measuring unit 18 immediately therebeneath, a dispensing unit 20 below the measuring unit and a mechanical counter together with associated operating and control mechanisms for the aforementioned components.

*Supply hopper*

Figure 8:
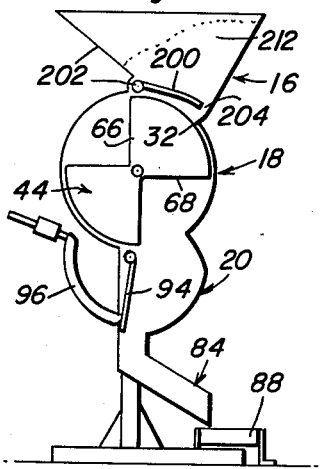
FIGURE 8 is a diagrammatic view of the dispensing operation of the apparatus.

The supply hopper which is suitably disposed between and supported by the upper ends of the support frame standards 14, is of any desired shape and size, being illustrated in the accompanying drawings as generally rectangular in plan with an open top defined by the upper edges of sloping, downwardly convergent, generally flat side walls 24, 26, 28 and 30, whose lower edges define a generally rectangular discharge opening 32 which, as shown in FIGURE 8, lies in a plane inclined to the horizontal.

Disposed in the hopper ot the lower portion thereof and in a position to control flow through the discharge opening 32 is an automatically operated control means to be set forth hereinafter.

*Measuring unit*

The measuring unit 18 consists of a generally cylindrical housing 34 located between and supported by the standards 14 immediately below the hopper 16 with which it has a controlled communication as set forth hereinafter. The housing includes a pair of end walls comprising circular plates 36 to whose peripheries are secured a pair of transversely arcuate, semi-cylindrical plates 38 and 40 constituting side walls of the measuring housing. The upper edges of the side walls 38 and 40 are spaced and are secured respectively to the lower ends of the hopper side walls 24 and 26 at the rectangular discharge opening 32, for the passage by gravity of the granular material from the supply hopper 16 into the chamber within the housing 34 of the measuring unit 18. The lower ends of the measuring unit housing side walls 38 and 40 are spaced to define a discharge opening 42 therebetween which is of a generally rectangular configuration and opens into the upper end of the dispensing unit 20 for the gravity flow of material thereinto.

Figure 11:
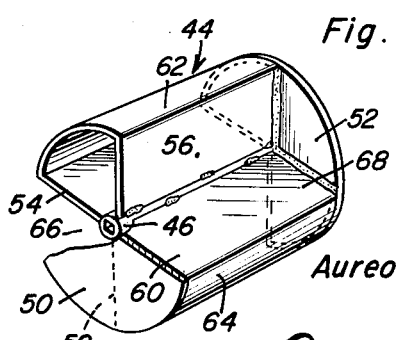
FIGURE 11 is a perspective view of the rotary measuring and dumping cylinder parts being broken away.

The measuring unit 18 includes as its measuring element, a generally cylindrical rotor or cylinder 44, see especially FIGURE 11, having a hollow, axially extending cylindrical sleeve 46 of non-circular cross-section, by which it is non-rotatably mounted upon a shaft 48 of similar cross-section which extends through the measuring housing end walls 36 and through the standards 14, being suitably journaled in the latter. The shaft 48 is disposed axially of the cylindrical chamber within the housing 34.

The rotor or cylinder 44 comprises circular end plates 50 and 52, fixedly secured to and positioned radially of the shaft 48 and having a sliding engagement with the end walls 36 of the measuring unit 18. Joined to the sleeve 46 and to the cylinder end plates 50 and 52 are pairs of radially and longitudinally extending plates 54, 56 and 58, 60. Cylindrical plates 62 and 64 respectively join the outer ends of the plates 54, 56 and the plates 58, 60 and have a close sliding fit with the side walls 38, 40. The sets of circular and cylindrical plates 54, 56 and 62 and 58, 60 and 64 constitute cylindrical sectors projecting radially from the sleeve 46 and define between themselves quadrant-shaped measuring pockets or chambers 66 and 68.

*Dispensing unit*

The dispensing unit 20 comprises a scale or weighing assembly and includes a housing likewise supported between the standards 14 and below the measuring unit 18. A pair of end walls 70 and side walls 72 and 74 have their upper ends joined to and depend from the lower edges of the measuring unit side walls 38 and 40, respectively, and define therebetween a dispensing chamber 76. At its lower end, the side wall 74 has a vertically extending portion or flange 78 which is parallel to the side wall 72 and together with the end walls 70 encloses an outlet or discharge passage 80 from the dispensing chamber. Inclined downwardly from the lower end of the wall 72 is a bottom 82 of a dispensing chute 84 whose side walls 86 comprise downwardly inclined extensions of the end walls 70. At its lower end, the chute 84 discharges material passing downwardly therethrough to a station 88 which may constitute a conveyor or the like.

The dispensing unit wall 74 has a portion which is arcuate and a shaft 90 is disposed at the center of curvature of the arcuate portion of the wall 74 being suitably journaled for oscillatory movement about a horizontal axis. The shaft 90 is preferably of non-circular cross-section and a tubular hub or sleeve 92 of similar cross-section is non-rotatably secured upon the shaft and carries a flat plate or blade 94 extending from the shaft and having an edge which is in sliding engagement with the arcuate portion of the wall 74. The blade 94 comprises a weighing scale which is oscillatable in the weighing chamber 76 as will be best apparent from a consideration of FIGURES 8, 9 and 10.

Rigidly connected to and extending downwardly and outwardly from the middle portion of the scale 94 is an acruate arm 96 whose curvature is concentric with the axis of the shaft 90. This arm extends through a slot 98 formed in the side wall 72 of the dispensing unit 20 and at its outer extremity is provided with a straight terminal portion 100 which is disposed radially of the axis 90. Upon the terminal portion 100 is adjustably positioned a counterweight 102 secured in adjustment upon the portion 100 as by a setscrew 104.

A weighing scale coil spring 106 has one end secured to the arcuate scale arm 96 and the other end secured to any suitable support such as a bracket 108 mounted upon the supporting frame 12.

Fixedly secured to one end of the scale shaft 90 is a stop arm 110, see FIGURES 4 and 5, which as set forth hereinafter serves to limit swinging movement of the scale or blade 94.

Figure 10:
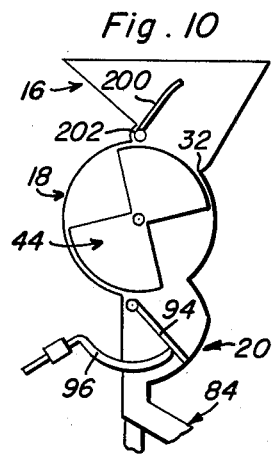
FIGURE 10 is a diagrammatic view of the partial measuring operation of the apparatus.

As will be set forth in detail hereinafter, the scale 94 is normally maintained in the vertical position shown in FIGURES 7 and 8 by the stop arm 110 in which position the discharge passage 80 is completely open. This freely open position is automatically and positively maintained until all of the quantity of material in the hopper 16 is measured and discharged except for a remainder which is less than one full batch or charge thereof. At that time, by mechanism to be subsequently set forth, the stop arm 110 is released and the scale 94 moves into the weighing position as shown in FIGURE 10 to retain and weigh the residue or fractional batch of the material to be dispensed. Thereafter, the scale arm 96 is manually elevated to the position shown in FIGURES 7 and 8 to lower the scale 94 and thereby discharge this weighed fractional batch of the material.

*Counter support and operating mechanism*

Attention is next directed to FIGURES 4–6 with regard to the means for supporting and operating the counter 22 which indicates the number of units or batches of the material which has been measured and dispensed by the apparatus. Indicated generally by the numeral 130 is a counter support in the form of a hingedly mounted bracket assembly. In addition to supporting the counter 22, the counter support performs a number of other important functions in the operation of the apparatus as set forth hereinafter.

The horizontal beam 132 at its lower end constitutes the base of the counter support 130 and has on one end an angularly extending plate 134. A hinge plate 136 is secured by bolts 138 to a standard 14 of the apparatus and by a vertical hinge pin 140 is pivotally connected to the angulated end plate 134 and mounts the support 130 for horizontal swinging movement about the vertical axis of the hinge pin 140, toward and from the adjacent side of the apparatus 10. Any suitable spring means such as a spring disposed about the hinge pin 140, not shown, may be provided to yieldingly bias the support 130 toward the apparatus 10.

Projecting laterally from the beam 132 is a horizontal flange 142 serving as a shelf or platform upon which the counter 22 is detachably mounted. Rising from the other end of the beam 132 is a vertical arm 144 whose upper portion is inclined toward the apparatus 10 to provide a plate cam 146. The upper end of the arm is further laterally angulated to provide a horizontally extending stop bracket or flange 148. Near the lower end of the arm 144 is a laterally projecting flange 150 comprising a scale stop flange or member.

The scale stop flange 150 cooperates with the previously mentioned stop arm 110 on the scale shaft 90 and serves to retain the scale 94 in its vertical position as shown in FIGURES 4, 7–9 during normal operation of the apparatus. The underside of the scale stop flange 150, see FIGURE 12, has a detent recess 152 in which is resiliently and yieldingly engaged a detent ball 154 resiliently carried in the usual manner in the scale shaft stop arm 110. When engaged, the detent means retains the scale 94 in its vertical inoperative position in the scale chamber 76.

The counter 22, which in itself may be of any conventional known design and whose construction forms no part of this invention, is connected to and operated by the measuring rotor 44 and thus counts and records the number of measured batches or charges of material which are delivered from the hopper into the scale chamber 76. At its left end, as viewed in FIGURE 4, the measuring rotor shaft 48 has a ratchet wheel 160 with which cooperates a spring load ratchet pawl carried by the standard 14, not shown. The ratchet mechanism limits the rotor 44 to unidirectional rotation and allows only a very limited reverse rotation in accordance with the tolerance or play in the ratchet.

At its other end, the rotor shaft 48 carries counter-actuating means. This includes a two-lobed radial cam plate 162 fixed to the shaft 48 and cooperating with an actuating plunger 164 projecting upwardly from the counter 22 and vertically movable upon rotation of the coacting counter actuating cam 162. Thus, each revolution of the measuring rotor 44 delivers two measured charges of material from the hopper to the dispensing chamber by the rotor pockets 66 and 68 and the two-lobed counter actuating cam 162 causes two actuations of the counter plunger 164.

Slidably mounted on the shaft 48 is a resilient stop plate 166 of greater size than the cam plate 162. It is yieldingly urged against the latter by the spring 168 and carries a pair of lateral pins 170 which are slidably received in corresponding holes 172 in the cam plate 162. This plate 166 constitutes a yieldable stop which is engageable by the counter plunger 164 when the counter support 130 is swung inwardly toward the apparatus 10.

Also fixed to the shaft 48 is a hand wheel 174 while a pair of laterally projecting latch pins 176 are fixedly mounted upon the counter actuating cam 162 for purposes to be subsequently set forth.

Hopper outlet control means

Disposed in the hopper 16 in association with the hopper discharge opening 32 is an actuator blade 200 comprising the actuator for a control mechanism of the apparatus. The blade 200 is fixedly secured to a horizontal pivot or rocker shaft 202 disposed at the bottom of the hopper adjacent a side wall 24 and substantially covers the entire area of the discharge opening but has its edge which is remote from the shaft 202 terminating in a slightly spaced relation to the hopper side wall 26, thus leaving a narrow passage therebetween as shown at 204 in FIGURES 8 and 9. This passage is of sufficient size to permit a slow trickle or flow of granular material therethrough from the hopper into the measuring unit 18 when the blade 200 is in its lowermost position.

Fixedly secured to the left end of the rocket shaft 202 as viewed in FIGURE 4 is an arm 206 to which one end of a spring 208 is attached, the spring having its other end suitably anchored to the support frame 12 as at 210 for yieldingly biasing the rocker shaft in a counterclockwise direction and urging the blade 200 to its lifted position as shown in FIGURE 10. The blade 200 is maintained in its lowered position during normal operation of the apparatus by the weight thereon of a mass of material 212 such as coffee beans in the hopper.

Operating mechanism connects an end of the rocker shaft 202 to various elements of the apparatus. Thus, a control cam element 220, see FIGURES 4 and 6, is fixedly secured to the right end of the rocker shaft. This element comprises a flat plate extending radially from the shaft and having a radially extending forward edge 222 constituting a cam surface. The control cam 220 is disposed closely adjacent the counter support arm 144 and cooperates with the cam plate 146 thereon and the stop flange 148.

When the weight of the coffee beans 212 upon the blade 200 decreases sufficiently, as for example to a weight which is less than that of one complete unit to be measured, as the beans are dispensed by the operation of the device, the spring 208 rotates the rocker shaft 202 and lifts the blade 200 to its elevated position. This swings the control cam 220 upwardly from the position of FIGURE 4 so that the engagement of the cam surfaces 222 and 146 moves the counter support 130 outwardly about its vertical hinge pin 140. Upward swinging of the control cam 220, however, is limited by its engagement with the stop flange 108 of the counter support arm 144.

The outward swinging of the counter support by the control cam 220 moves the counter actuating plunger 164 from beneath the counter actuating cam 162 so that rotation of the measuring cylinder 44 will not actuate the counter. At the same time, it moves the scale stop flange 150 out of blocking engagement with the scale stop arm 110, freeing the scale 94 for movement under its spring 106 into weighing position in the scale chamber 76 as shown in FIGURE 10. The purpose of these operations will become apparent during the description of the operation of the apparatus.

Associated with the control cam 220 is a latch means employed to condition the apparatus for starting. A latch arm 224 is rigidly mounted upon and projects downwardly from the underside of the control cam 220 and terminates at its lower end in a hook 226. There is sufficient lateral flexibility in the latch arm to enable the hook 226 to engage the uppermost of the latch pins 176 when the actuator blade is pressed down to its lowermost position and the measuring cylinder 44 is rotated by the hand wheel 174 to cause a pocket 66 or 68 to register with the hopper discharge opening 32.

Operation of the apparatus

From a consideration of the foregoing construction of the apparatus, its operation will now be readily understood. Assume that the machine is empty and it is desired to measure and distribute a bulk quantity of a granular material such as coffee beans into batches or charges of a uniform volume and therefore of a uniform weight. In this position, the blade 200 is raised and the scale 94 is released, the parts being positioned as shown in FIGURE 10. The control cam 220 is in its upper position, resting against the stop 148 and pressing outwardly on the cam surface 146 to move the counter support about its vertical pivot outwardly from the apparatus.

The counter actuating plunger 164 is out of engagement with the counter actuating cam 162 through the action of the cam surfaces 222 and 146.

In order to prepare the machine for operation, the hand wheel 174 is rotated until one of the latch pins 176 is in its uppermost position. Thereupon the control cam 220 and the actuator blade 200 are pressed downwardly in a clockwise direction about the axis of the rocker shaft 202, moving the latch arm 224 downwardly and causing its hook 226 to flex and engage the latch pin 176 in the manner shown in FIGURE 4. The scale arm 96 is manually pulled upwardly while the scale 94 is tilted downwardly to the position shown in FIGURES 4, 7–9 until the stop arm 110 moves under the scale stop flange 150 and the detent ball 154 engages in the detent recess 152 in the stop flange 150 as shown in FIGURE 12. This retains the scale in its open position as shown in FIGURES 7–9 in readiness for operation and one of the measuring pockets 66 or 68 is now disposed beneath the discharge opening 32 of the hopper.

Figure 9:
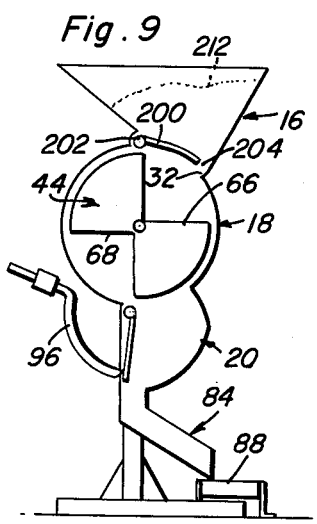
FIGURE 9 is a diagrammatic view of the measuring operation of the apparatus.

The hopper 16 is now filled with a quantity of the bulk granular material to be dispensed, the mass of material being indicated at 212 in FIGURES 8 and 9. The weight of this material is sufficient to overcome the resistance of the blade lifting spring 208 and maintain the blade in its lowered position after the latch hook 226 is disengaged from the latch pin 176.

At this point it is noted that the capacity of the measuring pockets of the measuring rotor or cylinder 44 is so selected as to measure a given volume of material for which the machine is to be operated. The counterweight 102 and the spring 106 are so adjusted that if more than a sufficient quantity of the material 212 is disposed in the hopper to form one complete measured batch or charge thereof, the weight will be sufficient to maintain the actuator blade 200 in its lowered position. However, if less than a sufficient quantity of material is in the hopper to supply one complete batch or charge, the spring 208 will lift the actuator blade 200, raise the control cam 222 and initiate a series of operations to be subsequently described.

With the hopper filled with material, the hand wheel 174 is moved slightly to cause the latch pin 176 to disengage from the latch hook 226, which disengagement movement will be effected by the inherent resiliency of the latch arm 224.

As soon as the granular material is supplied to the hopper, it will slowly trickle by gravity through the narrow passage 204 at the end of the actuator blade 200 and will fill the measuring pockets 64 or 66 adjacent therebeneath. When this pocket is full, and the latch means is manually released as previously described the weight of the coffee in the measuring pocket will effect rotation of the measuring cylinder 44, moving it from the loading position of FIGURE 9 to the dumping or discharging position of FIGURE 8. It will be noted that as soon as the loaded pocket moves away from the discharge opening 32 and the narrow passageway 204 leading thereto, the succeeding solid sectorial portion of the cylinder will close and block further flow through this opening while the measured charge is being dumped into the dispensing unit 20. From the latter the charge flows through the chute 84 to the collecting means 88 which may be either a conveyor belt or a series of receptacles each of which is to be filled with a charge of the coffee beans or other granular material being measured and dispensed.

It will thus be evident that gravity is relied upon as a means for effecting rotation of the measuring cylinder 44. Any suitable means such as a retarding brake or the like, not shown, may be applied to the cylinder or to insure its sufficiently slow rotation for efficient operation.

There will be sufficient inertia or momentum to the measuring cylinder to cause it to move the succeeding pocket into registration with the discharge opening to receive the next charge of the material. Each time the cylinder makes a complete revolution, two measured charges will have been removed from the hopper and delivered successively to their destination. At the same time, the counter actuating cam 162 has imparted two reciprocations to the counter plunger 164 thus recording the fact that two charges or batches have been measured and dispensed by the device.

This operation continues until such time as there is insufficient material left in the hopper to form a complete charge. At that time, the spring 208 will overcome the weight of the partial charge remaining upon the actuator plate 200 and cause the latter to lift to the raised position shown in FIGURE 10. At the same time, this will lift the control cam 220. As the cam 220 is lifted, its cam surface 222, see FIGURE 6, will engage the cam surface of the member 146 and thus swing the counter support 130 outwardly about the vertical pivot of the hinge pin 140. The upward movement of the control cam 220 will of course be stopped by engagement upon the underside of the stop flange 148. As a result of the outward swinging movement of the counter support 130, the actuator plunger 164 of the counter will be withdrawn from engagement by the actuator cam 162 so that no further actuation of the counter will occur. At the same time, the scale stop flange 150 will be withdrawn from the scale stop arm 110 allowing the latter to swing upwardly under the bias of the scale spring 106 so that the scale will now move from its idle position shown in FIGURES 7, 8 and 9 in which it does not hinder flow from the chamber 76 to the passage 80, its weighing position shown in FIGURE 10 in which it prevents further flow from chamber 76 to the passage 80.

With the lifting of the actuator blade 200 to its dotted line position shown in FIGURE 7 and its full line position shown in FIGURE 10, the rest of the coffee beans comprising a fractional batch or charge will enter the measuring chamber of the measuring cylinder, will then be discharged into the scale chamber 76 and will rest upon the scale 94. The weight of this fractional charge will move the latter downwardly and pivotally about its pivot 90 against resistance of the spring 106 for a distance which is proportional to the weight of the fractional charge. Suitable indicia upon the arm 96 will indicate this fact and enable the operator to determine the weight of the fractional charge. Thereupon the arm 96 is lifted manually to the position shown in FIGURE 7 and this fractional charge is in turn discharged through the chute 84.

It will be understood that when a very large quantity is to be measured, and dispensed, the hopper may be refilled from time to time without permitting depletion of the quantity of material therein to such reduced amount as to cause the actuator blade 200 to lift.

The foregoing is considered as illustrative only of the principles of the invention. Further, since numerous modifications and changes will readily occur to those skilled in the art, it is not desired to limit the invention to the exact construction and operation shown and described, and accordingly all suitable modifications and equivalents may be resorted to, falling within the scope of the invention as claimed.

What is claimed as new is as follows:

1. A device for measuring and dispensing flowable material comprising a support means, a reservoir for a quantity of the material on the support means, measuring means connected to the reservoir and adapted to automatically separate and measure the material into a plurality of units of a predetermined volume, said measuring means including other means adapted to automatically measure the fractional unit of material remaining in said reservoir after all the whole units of the material in said reservoir have been measured, an exhaust passage means connected to said measuring means and adapted to dispense each of said units and said fractional unit from said device after they have been measured by said measuring means.

2. A device for measuring and dispensing flowable material comprising a support means, a reservoir for a quantity of the material on the support means, measuring means connected to the reservoir adapted to automatically separate and measure the material into a plurality of units each of a predetermined volume, said measuring means including a weighing scale adapted to automatically measure the fractional unit of material remaining in said reservoir after all the whole units of the material in said reservoir have been measured, an exhaust passage means connected to said measuring means and adapted to dispense each of said units and said fractional unit from said device after they have been measured by said measuring means.

3. A device as defined in claim 2 wherein a counter is connected to said support means, operating means between said measuring means and said counter whereby said operating means operates said counter to count all the units measured by said measuring means, release means connected to said counter, said release means automatically disconnecting said counter and operating means when said reservoir contains less than one unit of said material.

4. A device as defined in claim 3 wherein said reservoir comprises a hopper located above said measuring means whereby the material may flow by gravity from said hopper into said measuring means.

5. A device as defined in claim 4 wherein the measuring means includes a cylinder rotatably supported on said support means for rotation on a horizontal axis and having diametrically opposed open pockets formed therein, a cylindrical housing fixed to said support means and enclosing said cylinder, said hopper communicating with the interior of the top of said housing at a location radially spaced from the axis of said cylinder.

6. A device as defined in claim 5 wherein said release means includes a first valve means located in said conduit means for partially closing same, resilient means urging said valve means upwardly, a counter support pivotally connected to said support means, connecting means connecting said first valve means to said counter support whereby the counter is operatively disconnected from said operating means when said resilient means moves said first valve means upwardly.

7. A device as defined in claim 6 wherein a second conduit means connects the bottom of said housing to said scale, said scale includes a second valve means located in said second conduit means, second resilient means urging said second valve means to a closed position, stop means on said counter support holding said second valve means in an open position when said first valve means is held down by the weight of the material in the hopper, said stop means releasing said second valve means when said release means disconnects said counter and operating means whereby said second resilient means moves said second valve means to a closed position.

8. A device as defined in claim 7 wherein second valve means is connected to a scale indicia which indicates the weight of said fractional unit when it is deposited on said second valve means.

9. A device as defined in claim 1 wherein said exhaust passage includes a sloping chute disposed below said measuring means and receiving by gravity flow material passing through the latter.

10. A device as defined in claim 2 wherein said scale includes a balance compensating weight.

11. An apparatus for measuring and dispensing charges of uniform quantity from a bulk flowable material comprising a reservoir for a bulk flowable material,
a measuring device moving between a charging position in which it receives from said reservoir and measures charges of uniform quantity of a flowable material and a discharge position at which the measured charges of uniform quantity are discharged,
a weighing device having a scale selectively movable into and out of the path of travel of the measured charges discharged from said measuring device,
means connected to said weighing device scale and yieldingly urging it into a weighing position disposed in said path of movement,
latch means connected to said weighing device and preventing movement of said scale into said weighing position,
latch release means connected to said latch means and freeing said weighing device from said latch means in response to the presence in said reservoir of less than the weight of a complete charge of material.

12. The combination of claim 11 including a passage means connecting said reservoir to said measuring device and limiting movement of said flowable material from the reservoir to said measuring device to a trickle flow.

13. The combination of claim 11 wherein said latch release means comprises a pivotally mounted actuator blade mounted in said reservoir and controlling flow through an outlet of said reservoir said actuator blade being biased to a raised position fully uncovering said outlet and being urged by the weight of a quantity of flowable material in said reservoir in excess of the weight of a complete charge to a position restricting flow through said outlet to a trickle.

References Cited by the Examiner
FOREIGN PATENTS
326,583  12/1928  Great Britain.

LOUIS J. DEMBO, *Primary Examiner.*